(12) United States Patent
Naqvi et al.

(10) Patent No.: US 8,682,551 B2
(45) Date of Patent: Mar. 25, 2014

(54) METHOD AND APPARATUS TO PROTECT POWERTRAIN COMPONENTS FROM EXCESSIVE FORCE DAMAGE DUE TO WHEEL LOCKUP

(75) Inventors: Ali K. Naqvi, White Lake, MI (US); Pinaki Gupta, Wixom, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 565 days.

(21) Appl. No.: 12/971,657

(22) Filed: Dec. 17, 2010

(65) Prior Publication Data

US 2012/0158224 A1 Jun. 21, 2012

(51) Int. Cl.
*F16D 48/06* (2006.01)
*B60K 6/38* (2007.10)

(52) U.S. Cl.
USPC ............................... 701/67; 701/22

(58) Field of Classification Search
USPC ............... 701/22, 48, 53, 54, 69, 51, 65, 67; 477/8, 176
See application file for complete search history.

(56) References Cited

U.S. PATENT DOCUMENTS

| | | | |
|---|---|---|---|
| 4,827,798 A * | 5/1989 | Oldfield ........................ 188/269 |
| 5,325,946 A * | 7/1994 | Kashiwabara et al. ...... 192/3.31 |
| 7,197,383 B2 * | 3/2007 | Tobler et al. .................... 701/22 |
| 8,452,469 B2 * | 5/2013 | Otokawa ......................... 701/22 |
| 2001/0048226 A1 * | 12/2001 | Nada ............................ 290/40 C |
| 2005/0182533 A1 * | 8/2005 | Tobler et al. .................... 701/22 |
| 2006/0000685 A1 * | 1/2006 | Puiu ........................... 192/85 AA |
| 2007/0155584 A1 * | 7/2007 | Tabata et al. ................... 477/70 |
| 2009/0111645 A1 * | 4/2009 | Heap et al. ........................ 477/5 |
| 2009/0112427 A1 * | 4/2009 | Heap et al. ...................... 701/67 |
| 2010/0286858 A1 * | 11/2010 | Otokawa ......................... 701/22 |
| 2011/0061954 A1 * | 3/2011 | Singh et al. ................. 180/65.22 |

* cited by examiner

*Primary Examiner* — Jason Holloway
(74) *Attorney, Agent, or Firm* — Quinn Law Group, PLLC

(57) ABSTRACT

An example vehicle includes an engine and a motor-generator configured to generate a torque in a first direction. A torque limiter clutch is configured to dissipate a torque in a second direction that opposes the first torque. The torque in the second direction may be caused by a force event. A control processor is configured to detect a possible force event and control the torque limiter clutch in response to detecting the possible force event. A method of controlling the torque limiter clutch includes detecting a possible force event, reducing fluid pressure to the torque limiter clutch in response to detecting the possible force event, confirming the possible force event, maintaining the reduced fluid pressure to the torque limiter clutch if the force event is confirmed, and increasing the fluid pressure to the torque limiter clutch if the force event is not confirmed.

11 Claims, 2 Drawing Sheets

METHOD AND APPARATUS TO PROTECT POWERTRAIN COMPONENTS FROM EXCESSIVE FORCE DAMAGE DUE TO WHEEL LOCKUP

TECHNICAL FIELD

The disclosure relates to a procedure for protecting vehicle hardware from damage caused by excessive force due to, for instance, sudden wheel lockup.

BACKGROUND

Most non-conventional passenger and commercial vehicles like those equipped with hybrid powertrains and dual clutch transmissions do not use torque converters to connect the engine to the transmission. In addition, hybrid powertrains may have one or more integrated motor-generators with significant inertia. Such systems may experience inertial forces on hardware components during braking, such as hard braking on low friction surfaces.

SUMMARY

An example vehicle includes an engine and a motor-generator configured to generate a torque in a first direction. A torque limiter clutch is configured to dissipate a torque in a second direction that opposes the first torque. The torque in the second direction is caused by a force event. A control processor is configured to detect a possible force event and control the torque limiter clutch in response to detecting the possible force event.

A method of controlling a torque limiter clutch in a vehicle includes detecting a possible force event and reducing fluid pressure to the torque limiter clutch in response to detecting the possible force event. The method further includes confirming the possible force event, maintaining the reduced fluid pressure to the torque limiter clutch if the force event is confirmed, and increasing the fluid pressure to the torque limiter clutch if the force event is not confirmed.

The example implementation described herein may reduce the inertial force applied to vehicle hardware mounts during the force event. These features and advantages and other features and advantages of the present invention are readily apparent from the following detailed description of the best modes for carrying out the invention when taken in connection with the accompanying drawings.

DETAILED DESCRIPTION

A powertrain system having a torque limiter clutch is provided that is able to reduce the inertial force applied to vehicle hardware mounts during a force event that causes a torque that opposes the torque provided by an engine and/or a motor-generator and that can damage the hardware mounts on the vehicle. The vehicle may control the torque limiter clutch in a way that dissipates the opposing torque. In one example implementation, the pressure of the fluid provided to the torque limiter clutch may be reduced upon detection of the force event. The reduced pressure may be sufficient to maintain the engagement of the torque limiter clutch under normal circumstances, but allow the plates of the torque limiter clutch to slip relative to one another during the force event (e.g., when provided with the opposing torque). Furthermore, the torque limiter clutch may not always be the same clutch in the vehicle. Rather, the torque limiter clutch may be selected among any clutch in the power flow based on the operating mode of the vehicle. That is, the torque limiter clutch may be selected in real time from the clutch or clutches best able to dissipate the opposing torque.

Figure 1:
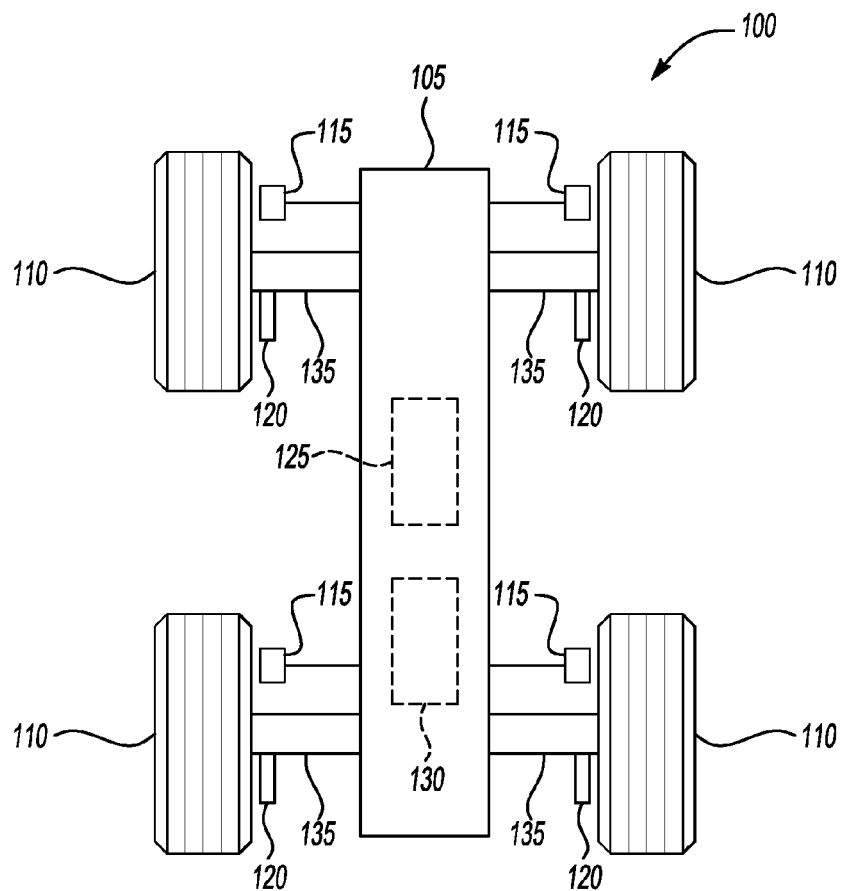
FIG. 1 is a schematic diagram of a vehicle having a powertrain system and a plurality of wheels.

FIG. 1 illustrates a vehicle 100 having a powertrain system 105 that is able to reduce the inertial force applied to vehicle hardware mounts during force events. The powertrain system 105 may take many different forms and include multiple and/or alternate components and facilities. While an example powertrain system 105 is shown in the Figures, the components illustrated in the Figures are not intended to be limiting. Indeed, additional or alternative components and/or implementations may be used.

The vehicle 100 includes the powertrain system 105, a plurality of wheels 110, a plurality of sensors 115, and a braking system 120. The vehicle 100 may be any passenger or commercial automobile. Further, the system may be implemented in a hybrid electric vehicle including a plug-in hybrid electric vehicle (PHEV) or an extended range electric vehicle (EREV), a gas-powered vehicle, a battery electric vehicle (BEV), or the like.

The powertrain system 105 may include various components that may be used to directly or indirectly propel the vehicle 100. For instance, as discussed in greater detail below with respect to FIG. 2, the powertrain system 105 may include an engine 205, a motor-generator 210, a gearbox 215, one or more clutches 220, and a valve body 225. Of course, the powertrain system 105 may include additional or alternative components as well as those described herein. As discussed in greater detail below, the powertrain system 105 may further include a control processor 125 and a brake controller 130.

The wheels 110 are configured to facilitate the motion of the vehicle 100 relative to a driving surface. That is, the wheels 110 are configured to rotate, and friction between the wheels 110 and the driving surfaces causes the vehicle 100 to move. The wheels 110 may be operatively connected to one or more axles 135 connected to the powertrain system 105. This way, the wheels 110 may receive a torque generated by the powertrain system 105 via the axles 135.

Each sensor 115 may include any device configured to measure the rotational speed of one or more of the wheels 110 and output one or more signals representative of the measured rotational speed. Accordingly, the sensors 115 may include one or more encoders or resolvers. The vehicle 100 may include any number of sensors 115. For instance, in the particular approach illustrated in FIG. 1, the vehicle 100 includes four sensors 115, each associated with one of the wheels 110. That is, the sensors 115 may be mounted such that each sensor 115 is able to directly measure the rotational speed based on the rotation of the wheel 110. Alternatively, the sensors 115 may be configured to measure the rotational speed of the axle 135 connected to the wheel 110 and derive the rotational speed of the wheel 110 from the rotational speed of the axle 135. This way, the sensors 115 may indirectly measure the rotational speed of the wheels 110. Other sensors (not shown) may be disposed at other places in the vehicle 100.

The braking system 120 may include any device or devices configured to slow the rotation of the wheels 110. For instance, the braking system 120 may include a friction element that, when actuated, applies a braking force to one of the wheels 110. The friction element may be hydraulically or electrically actuated. The amount of the braking force applied to the wheel 110 may be based on, for instance, an amount of braking force applied to a brake pedal (not shown) by a driver of the vehicle 100.

The control processor 125 may include any device configured to identify force events, which may include any situation that may cause an excessive amount of force to be placed on a shaft within the powertrain system 105 that opposes a torque provided by the engine 205, the motor-generator 210, or both. The control processor 125 may be further configured to respond to the force event, confirm the force event, and take remedial action if the force event is confirmed. Additionally, the control processor 125 may be further configured to abort any remedial action as soon as the control processor 125 determines that the force event no longer exists or was falsely identified.

The force event may include a hard brake condition on a low friction surface. Other types of force events may include excessive vibration, an engine misfire, locking wheels, etc. The control processor 125 may be configured to identify the force event based on, for example, information received from the sensors 115 or other sensors in the vehicle. In one possible implementation, the control processor 125 may be configured to identify a hard brake condition based on the pressure provided to a brake pedal.

The brake controller 130 may include any device configured to control the operation of the braking system 120. In one particular approach, the way in which the brake controller 130 controls the braking system 120 may depend upon various driving conditions, such as a hard braking condition and/or a low friction condition. For example, the brake controller 130 may be configured to apply a first braking procedure during a hard brake condition and a second braking procedure during a low friction condition that is at least partially concurrent with the hard braking condition. One difference between the first and second braking procedures may be that the brake controller 130 is configured to apply a shallower brake pressure response curve during the second braking procedure relative to the first braking procedure.

Figure 2:
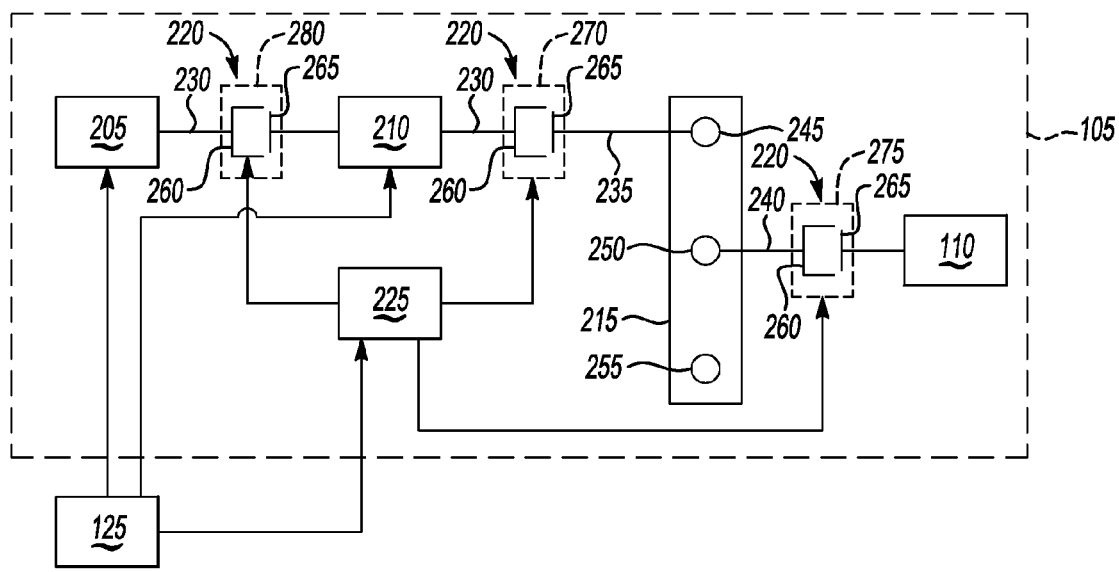
FIG. 2 illustrates a schematic diagram of example components of the powertrain system of FIG. 1.

Referring now to FIG. 2, the powertrain system 105 may include the engine 205, the motor-generator 210, the gearbox 215, one or more clutches 220, and a valve body 225. One or more of the clutches 220 may be a part of or separate from a transmission with the gearbox 215. Similarly, the valve body 225 may be implemented as part of the transmission with the gearbox 215. Moreover, while only one gearbox 215 is illustrated, the vehicle 100 may include any number of gearboxes 215, and each gearbox 215 may include any number of gears.

The engine 205 may include any device configured to generate torque by converting energy from a fuel into rotational motion. For instance, the engine 205 may include an internal combustion engine. The engine 205 may output torque to a crankshaft 230 in at least one direction (e.g., a first direction). The operation of the engine 205 may be controlled by an engine control unit (not shown) in communication with the control processor 125.

The motor-generator 210 may include any device configured to generate a torque by converting electrical energy into rotational motion. The motor-generator 210 may be further configured to generate electrical energy when provided with a torque to, for instance, charge a power source (not shown), such as a battery. Like the engine 205, the motor-generator 210 may output the torque generated onto a crankshaft 230 in at least one direction (e.g., the first direction). The motor-generator 210 may be controlled by a motor-generator control unit (not shown) in communication with the control processor 125.

The gearbox 215 may include any device configured to convert rotational motion from the engine 205 and/or motor-generator 210 into the rotational motion provided to the wheels of the vehicle 100. That is, the gearbox 215 may receive the torque from the engine 205, the motor-generator 210, or both, via an input shaft 235, and convert that torque to the torque needed to rotate the wheels 110 of the vehicle 100. The gearbox 215 may provide torque to the wheels via an output shaft 240. The gearbox 215 may include any number of gears. For simplicity, the gearbox 215 is illustrated as a lever with three nodes representing connections to various gears. A first node 245 may be operatively connected to the crankshaft 230 to receive torque from the engine 205 and/or motor-generator 210, while a second node 250 may be operatively connected to the wheels 110. That is, the second node 250 may represent a connection to the output shaft 240. Another device, such as another motor-generator (not shown), may be operatively connected to a third node 255, which may also be used to provide torque to the output shaft 240. Although not shown, the powertrain system 105 may include additional gearboxes. The operation of the gearbox 215 may be controlled by a transmission control unit (not shown) in communication with the control processor 125.

The powertrain system 105 may include one or more clutches 220 to transfer torque from the engine 205, from the motor-generator 210, and from the gearbox 215. As illustrated in FIG. 2, one clutch 280 may be operably disposed between the engine 205 and the transmission 210 to transfer torque to the gearbox 215. Another clutch 270 may be operably disposed between the motor-generator 210 and the gearbox 215 to transfer torque to the gearbox 215. Yet another clutch 275 may be operably disposed on the output shaft 240 of the gearbox 215 to transfer torque to the wheels 110. Of course, the powertrain system 105 may include any number of clutches 220 instead of or in addition to those illustrated in FIG. 2. As discussed in greater detail below, one or more of these or any other clutches in the powertrain system 105 may be used as a "torque limiter clutch" that may dissipate a torque provided to the output shaft 240 that opposes the torque from the engine 205 and/or motor-generator 210.

In general, each clutch 220 may include any device or devices configured to engage and transfer torque. For instance, each clutch 220 may include a driving mechanism 260 and a driven mechanism 265. The driving mechanism 260 may be configured to receive the torque generated by the engine 205, the motor-generator 210, or provided to the output shaft 240 of the transmission 210. The driven mechanism 265 may be configured to rotate when engaged with the driving mechanism 260, and thus, transfer the torque provided to the driving mechanism 260. When disengaged, the driving mechanism 260 and driven mechanism 265 may rotate freely relative to one another. Moreover, each of the clutches 220 may be hydraulically operated. That is, providing the clutch 220 with a fluid pressure above a threshold pressure causes the clutch 220 to engage. Likewise, the clutch 220 may disengage when provided with fluid below the threshold pressure.

For purposes of illustration only, the clutch 275 at the output of the gearbox 215 is described as the "torque limiter clutch," however, the clutch 270 disposed between the motor-generator 210 and the gearbox 215 and/or the clutch 280 disposed between the engine 205 and the engine 205 and the motor-generator 210 may alternatively be used as the "torque limiter clutch." Indeed, the control processor 125 may be configured to select, in real time, the clutch 220 in the power flow that is best able to dissipate the opposing torque as the "torque limiter clutch" based on the operating mode of the vehicle 100. Accordingly, any one or more clutches, illustrated in FIG. 2 or otherwise, in the powertrain system 105 may be used as the "torque limiter clutch" instead of or in addition to the clutches 220 illustrated in FIG. 2.

The valve body 225 may include any device configured to provide fluid at a commanded pressure to various hydraulic components in the vehicle 100. Thus, the valve body 225 may be used to control the individual fluid pressures provided to each of the clutches 220. In one possible approach, the valve body 225 may be part of a transmission.

In operation, the control processor 125 may control the operation of one or more of the clutches 220 to cause one or more of the clutches 220 to act as the torque limiter clutch. The opposing torque caused during the force event acts on the driven mechanism 265 of one or more of the clutches 220 in the powertrain system 105. To dissipate the opposing force, the control processor 125 may command the valve body 225 to reduce the fluid pressure provided to the torque limiter clutch 275 from a first pressure to a second pressure. The first pressure and the second pressure are both sufficient to cause the driving mechanism 260 and driven mechanism 265 of the torque limiter clutch 275 to be engaged under normal circumstances. During the force event, however, reducing the pressure to the torque limiter clutch 275 to the second pressure may allow the driving mechanism 260 and the driven mechanism 265 to slip relative to one another when the driven mechanism 265 is provided with the opposing torque. The friction caused by this slipping may cause some or all of the opposing torque to be dissipated as heat, and thus, may prevent the opposing torque from damaging hardware mounts in the vehicle 100.

As previously discussed, the control processor 125 may be configured to confirm the existence of the force event. Upon confirmation of the force event, the control processor 125 may be configured to maintain the commanded pressure at the second pressure for a predetermined amount of time or for the duration of the force event. If the force event is not confirmed (e.g., deemed to be a false alarm or if the force event is over), the control processor 125 may be configured to command the valve body 225 to ramp up the fluid pressure to the torque limiter clutch 275 from the second pressure to the first pressure. Because the second pressure is sufficient to engage the torque limiter clutch 275, the driver of the vehicle 100 is unlikely to experience a significant disturbance while driving the vehicle 100 during suspected force events.

In general, computing systems and/or devices, such as the control processor 125, the brake controller 130, the engine control unit, the motor-generator control unit, and the transmission control unit, may employ any of a number of computer operating systems and generally include computer-executable instructions, where the instructions may be executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 3:
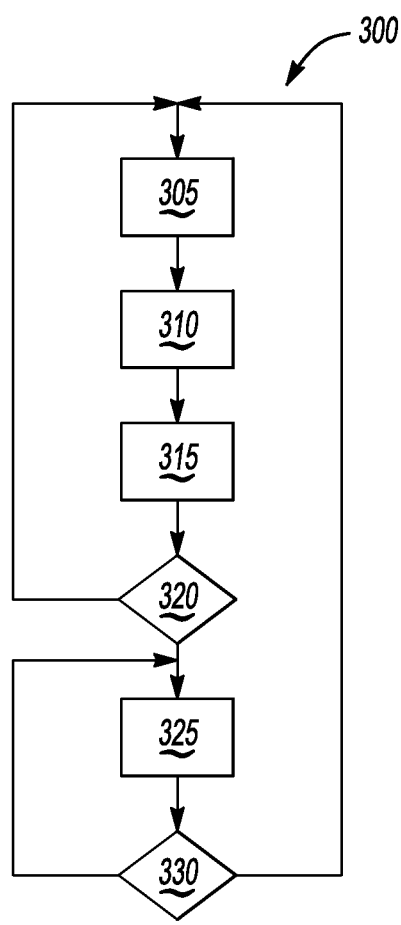
FIG. 3 is a flowchart of a process that may be implemented by the powertrain system of FIGS. 1 and 2 during a possible force event.

FIG. 3 illustrates a process 300 that may be implemented by various components of the powertrain system 105 to control the one or more of the clutches 220, including the torque limiter clutch 275, during possible force events. Again, although illustrated as the clutch 275, the torque limiter clutch may be any one or more of the clutches 220, whether illustrated or otherwise, in the powertrain system 105. For instance, the control processor 125 may be configured to select one or more clutches 220 in the power flow that are best able to dissipate the opposing torque as the "torque limiter clutch." Accordingly, a similar approach may be used to control one or more of the other clutches 220 in the powertrain system 105 during the force event.

At block 305, the powertrain system 105 may engage the torque limiter clutch 275. For instance, the control processor 125 may engage the torque limiter clutch 275 by commanding the valve body 225 to provide fluid at the first fluid pressure to the torque limiter clutch 275. When provided with the first pressure, the torque limiter clutch 275 may engage so that the driving mechanism 260 and the driven mechanism 265 of the torque limiter clutch 275 rotate at substantially the same speed (e.g., there is substantially no slip). When engaged under normal circumstances, the torque limiter clutch 275 transfers torque in the first direction from the engine 205 and/or motor-generator 210.

At block 310, the powertrain system 105 may detect a possible force event. As discussed above, detecting the possible force event may include detecting a torque in a direction (e.g., the second direction) that opposes the torque provided by the engine 205 and/or motor-generator 210. The control processor 125 need not actually measure or detect the opposing torque. Indeed, the existence of the opposing torque may be inferred from other circumstances, such as the detection of a hard brake condition on a low friction surface using the sensors 115 as described above.

At block 315, the powertrain system 105 may reduce the fluid pressure to the torque limiter clutch 275 in response to detecting the possible force event. In one possible implementation, the control processor 125 may select, in real time, one or more of the clutches 220 (e.g., the clutch 220 most relevant in the power flow to dissipate the opposing torque) as the torque limiter clutch 275. The control processor 125 may command the valve body 225 to provide the fluid to the torque limiter clutch 275 at the second pressure, which is lower than the first pressure but sufficient to maintain the engagement of the torque limiter clutch 275. Nevertheless, when provided with the fluid at the second pressure, the opposing torque may be sufficient to cause the driving mechanism 260 of the torque limiter clutch 275 to slip relative to the driven mechanism 265 of the torque limiter clutch 275. Accordingly, the torque limiter clutch 275 may dissipate the opposing torque as heat when provided with fluid at the second pressure. Further, as discussed above, the brake controller 130 may implement a shallower (e.g., less aggressive) brake pressure response curve in response to detecting the possible force event.

At decision block 320, the powertrain system 105 may confirm whether the possible force event currently exists or whether the detected force event at block 310 was a false alarm. If the force event is confirmed, the process 300 may continue at block 325. If the force event was a false alarm or no longer exists (e.g., the vehicle 100 has traversed a low friction surface, the hard brake condition is over, etc.), the process 300 may continue at block 305.

At block 325, the powertrain system 105 may maintain the reduced fluid pressure to the torque limiter clutch 275. That is, the control processor 125 may continue to command the valve body 225 to provide fluid at the second pressure to the torque limiter clutch 275. This way, the control processor 125 may maintain the engagement of the torque limiter clutch 275 unless the opposing force is sufficient to cause the driven mechanism 265 to slip relative to the driving mechanism 260. The friction caused by this slipping may help dissipate the opposing torque as heat.

At decision block 330, the powertrain system 105 may determine whether the force event is over or if a predetermined amount of time has elapsed. For instance, the control processor 125 may continuously examine whether the force event is still occurring. Alternatively, the control processor 125 may be configured to maintain the commanded pressure at the second pressure for the predetermined amount of time, which may be based on an estimated duration of the force event. If the force event is determined to be over or if the predetermined amount of time has elapsed, the process 300 may continue at block 305 to command the valve body 225 to provide the torque limiter clutch 275 with fluid at the first pressure. If the force event is not over, or if the predetermined time has not lapsed, the process 300 may continue at block 325.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a plurality of wheels;
   a gearbox;
   a valve body;
   an engine configured to generate a torque in a first direction;
   a motor-generator configured to generate a torque in the first direction;
   a plurality of hydraulic clutches, each in fluid communication with the valve body and configured to transfer torque from at least one of the engine and the motor-generator in a first direction and to selectively dissipate a torque in a second direction that opposes the first torque, wherein the torque in the second direction is caused by a force event, and wherein each of the hydraulic clutches selectively connects a corresponding one of: the engine to the motor-generator, the motor-generator to the gearbox, and the gearbox to the wheels;
   a plurality of wheel speed sensors, each of which is configured to measure a rotational speed of a corresponding one of the plurality of wheels; and
   a control processor in communication with the valve body and with the plurality of wheel speed sensors that is configured to detect a possible force event using the measured rotational speeds from the plurality of wheel speed sensors, and further configured to select at least one of the hydraulic clutches in the vehicle to selectively function as a torque limiter clutch based on an operating mode of the vehicle, and further configured to reduce the fluid pressure to the selected at least one hydraulic clutch which causes slipping of the selected at least one hydraulic clutch in response to detecting the possible force event.

2. A vehicle as set forth in claim 1, wherein the control processor is configured to confirm the possible force event.

3. A vehicle as set forth in claim 2, wherein the control processor is configured to fully engage the selected at least one hydraulic clutch via increased hydraulic pressure from the valve body if the possible force event is not confirmed.

4. A vehicle as set forth in claim 2, wherein the control processor is configured to control engagement of the selected at least one hydraulic clutch for a predetermined amount of time if the possible force event is confirmed.

5. A vehicle as set forth in claim 2, wherein the control processor is configured to control engagement of the selected at least one hydraulic clutch for a duration of the force event if the possible force event is confirmed.

6. A vehicle as set forth in claim 1, further comprising a braking system configured to generate the torque in the second direction.

7. A vehicle as set forth in claim 1, wherein the possible force event includes a hard brake condition on a low friction surface.

8. A vehicle as set forth in claim 1, wherein the valve body is configured to provide fluid at a first pressure to the hydraulic clutches, wherein the selected at least one hydraulic clutch is configured to fully engage upon receipt of the provided fluid at the first fluid pressure.

9. A vehicle as set forth in claim 8, wherein the valve body is configured to provide fluid to the selected at least one hydraulic clutch at a second fluid pressure to reduce the torque capacity of the selected at least one hydraulic clutch, and wherein the selected at least one hydraulic clutch is configured to slip during the force event when provided with fluid at the second fluid pressure.

10. A vehicle as set forth in claim 9, wherein the valve body is configured to provide fluid to the selected at least one hydraulic clutch at the second fluid pressure for at least one of a predetermined amount of time and a duration of the force event.

11. The vehicle of claim 1, wherein the force event is one of an engine misfire and a locking of at least one of the plurality of wheels.

* * * * *